Figure 1:
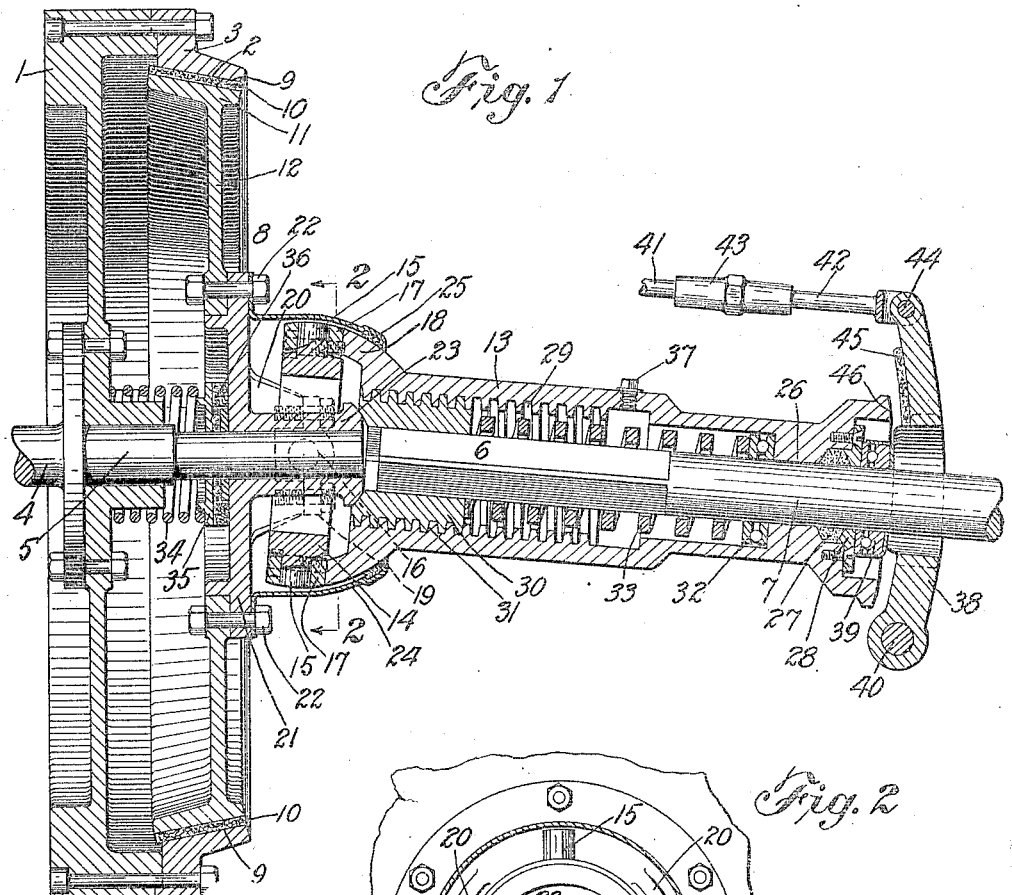

S. I. PRESCOTT.
CLUTCH.
APPLICATION FILED JULY 5, 1912.

1,049,532.

Patented Jan. 7, 1913.

Attest
Frank N. Vick Jr.
Elizabeth L. Russell

Inventor
Sydney I. Prescott

UNITED STATES PATENT OFFICE.

SYDNEY I. PRESCOTT, OF BROOKLYN, NEW YORK.

CLUTCH.

1,049,532.  Specification of Letters Patent.  Patented Jan. 7, 1913.

Application filed July 5, 1912. Serial No. 707,651.

*To all whom it may concern:*

Be it known that I, SYDNEY I. PRESCOTT, a citizen of the United States, residing at Brooklyn, county of Kings, and State of New York, have invented a new and useful Improvement in Clutches, of which the following is a specification.

This invention relates to an improvement in clutches, particularly those used in the driving mechanism of motor cars or automobiles.

Two general types of clutches designed particularly for use on motor cars have heretofore been in common use. One type includes a female cone clutch member carried by and rotating with or forming a part of the flywheel of an internal combustion motor, and also includes a coöperating male cone clutch member rotatable with the transmission shaft and movable in and out of engagement with the other clutch member. The other type includes a series of friction disks alternately carried by a driving clutch member which derives motion from an internal combustion motor, and by a driven clutch member which is adapted to rotate with a transmission shaft. In both types, the driving friction of the clutch members must be sufficient to transmit the maximum power of the motor without any slip of the clutch members; otherwise control of motion of the car under maximum power and maximum load would be lost.

Two general types of driving mechanism for motor cars or automobiles have heretofore been in common use. In one type, what is known as the transmission gearing; that is to say, the gearing by means of which the relative speed of the motor shaft and of the driving axle is varied, is mounted upon the chassis of the car with its main element in alinement with the motor crank shaft. In the other type, the corresponding transmission gearing is carried by the rear axle adjacent the differential gearing and is not supported by the chassis. In the latter type, the position of the transmission gearing with respect to the chassis is constantly varying while the car is in operation. In this type also the transmission gearing is driven by a propeller shaft which derives its motion from the crank shaft of the motor and which must be mounted in such a manner as to permit variation in its angularity with respect to the axis of the motor crank shaft. This is ordinarily effected through the agency of a universal joint connecting the propeller shaft with a short shaft operated by one of the clutch members. In my copending application, filed April 13, 1912, Serial No. 690,555, a clutch member is disclosed which is adapted to be used in connection with the first type of driving mechanism above mentioned.

The present invention relates more particularly to the second type of driving mechanism above referred to, or in other words, to the type in which the angularity of the motor crank shaft and of the propeller shaft between the motor and the transmission gearing is variable.

The main objects of the present invention are the same as the main objects of the invention disclosed in the application above referred to, and reference is made to the said application for a full disclosure of said objects and the general means whereby they are carried into effect.

The main object of the present invention, apart from the objects above mentioned, is the production of a device of the general character disclosed in the above application, but which is designed so that the various elements of the clutch will automatically assume varying relative positions, which positions are controlled by the irregularities of the road over which the car carrying the device is running, or by any variations in load which may occur, or by both.

A further object of the present invention is the production of a device of the character just mentioned, in which provision is made for longitudinal movement of the propeller shaft due to the constantly changing position of the driving axle relative to the chassis.

With this and other objects not specifically mentioned in view, the invention consists in certain constructions and combinations which will be hereinafter fully described and then specifically set forth in the claims hereunto appended.

Figure 2:
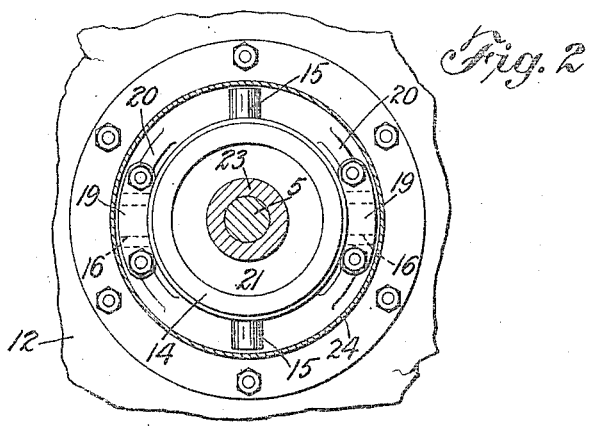

In the accompanying drawings, which form a part of this specification and in which like characters of reference indicate the same or like parts, Figure 1 is a sectional view of a device constructed in accordance with the invention, and Fig. 2 is a fragmentary sectional view taken on the line 2—2 in Fig. 1 and having certain parts omitted.

The device selected to illustrate the invention constitutes a concrete embodiment of the invention; but it is to be understood that the various elements of the structure shown and described may be varied in construction within wide limits, and that the invention therefore is not to be restricted to the precise details of the structure shown and described.

In the device selected to illustrate the invention, 1 indicates a motor driven member carrying an annular frictional driving surface 2, which surface is the inner periphery of a female cone clutch member 3. The motor driven member is supported and rotated by means of a driving shaft 4, having a tail 5 projecting beyond the hub of the motor driven member and having its extremity somewhat reduced in diameter. This motor driven member 1 and driving shaft 4 may be respectively the flywheel and the crank shaft of an internal combustion motor, not shown but located to the left of Fig. 1. A transmission or propeller shaft is provided, which is adapted to transmit motion from the motor driven member 1 to transmission gearing and other transmission mechanism not shown but located at the right in Fig. 1. This shaft has a squared forward end 6, and a cylindrical rear end 7 extending toward the transmission gearing.

There is further provided a two-part articulated clutch member generally indicated by the reference numeral 8, and which is interposed between the motor driven member 1 and the transmission shaft 6—7. This clutch member 8 is provided with an annular frictional driving surface 9, adapted to coöperate with the frictional driving surface 2 before referred to. This surface 9 is the outer surface of a ring 10 of leather or other suitable material, said ring being securely fastened to the rim 11 of a member 12 located in close proximity to the motor driven member 1 before referred to. This member 12, with the ring 10, forms a male cone clutch member, and the frictional driving contact of the surfaces 2 and 9 is sufficient when fully engaged to cause the clutch member 8 to be rotated without slip under any load. For the reason that the surfaces 2 and 9 operate primarily to transmit motion from the motor driven member 1 to the transmission shaft 6—7 and for the further reason that the clutch member 8 has additional frictional driving surfaces, said surfaces 2 and 9 may be termed primary frictional driving surfaces.

The clutch member 8 includes the member 12 and a sleeve 13 articulated with and extending rearwardly from the center of said member 12 and at a variable angle to the diametrical planes of the surface 9. The articulated connection of the member 12 with the sleeve 13 is effected by means of a ring 14 having two diametrically disposed studs 15—15 and two diametrically disposed studs 16—16, the studs 15—15 and the studs 16—16 being at right angles to each other. The studs 15—15 engage journal boxes 17—17 bolted to a head 18 formed on one end of the sleeve 13 before mentioned. The studs 16—16 engage journal boxes 19—19 bolted to ribs 20 projecting from a plate 21, which plate is secured to the member 12 by means of a series of bolts 22. The plate 21 is further provided with a hub 23 which is journaled upon the reduced end of the tail shaft 5 before referred to and is adapted to slide and rotate thereon. The shaft 4—5 forms a common support for the driving clutch member 1 and the articulated driven clutch member 8.

For the purpose of excluding dust from and retaining a lubricant within the space between the hub 23 and the head 18 of the sleeve 13, there is provided a metal cap 24 which is held in place by means of the bolts 22, and which carries an annular packing ring 25 engaging the spherical outer surface of the head 18. It may be here remarked that the space within the cap 24 is packed with lubricant so that it will not require attention for a long period.

At a point near its rear end, the sleeve 13 is reduced in diameter and in this reduced portion there is formed a bearing 26 within which the cylindrical portion of the transmission or propeller shaft 6—7 is adapted to rotate and slide. For the purpose of preventing lubricant within the sleeve from escaping at the rear end thereof, there is provided a packing ring 27 held in place by means of a gland 28 of well-known construction.

The sleeve 13 is provided with an internal thread 29, the operating face of which constitutes a secondary frictional surface carried by the clutch member. There is further provided what may be termed a transmission member, consisting of a worm 30 having an external thread 31, the operating face of which constitutes what may be termed a secondary frictional surface. This secondary surface coöperates with the thread or secondary frictional surface 29 of the clutch member. The length of the sleeve and the pitch of the worm are designed to permit several revolutions of the sleeve on the worm while the latter is traveling from one extreme position to the other. The transmission member or worm 30 is provided with a central squared aperture engaging the squared end 6 of the transmission or propeller shaft 6—7, so that said transmission member is always rotatable with and is slidable upon said transmission or propeller shaft.

A pressure device is provided which bears against a thrust bearing 32 housed within the sleeve 13, and also engages the transmission member or worm 30. This pressure device consists of a spring 33 coiled around the squared end of the transmission shaft. The pressure device is adapted to hold the secondary frictional surfaces in contact under sufficient pressure to prevent slipping of said secondary surfaces under normal load, and is adapted to permit relative slip of said secondary surfaces for a plurality of turns under a load above normal. It is to be understood that the spring 33 is designed to produce the desired result when used with a motor of a given power and car of a given weight and that, when the power and weight are different a different spring must be used. By an inspection of Fig. 1, it will be observed that the internal thread of the sleeve is left-handed and that the spring 33 is coiled right-handed. This is to prevent the possibility of the turn of the spring catching on the edge of the thread during compression. It may be here remarked that what is meant herein by the term "normal load" is the load on the motor of the car under normal running conditions; that is to say, when the car is running along at a moderate speed on a level road.

It will be readily understood that when the motor driven member 1 and the clutch member 8 begin to rotate in locked engagement while the transmission or propeller shaft 6—7 is not rotating, and also when the motor driven member 1 and the clutch member 8 are rotating faster than the transmission shaft 6—7, the transmission member 30 will be caused to move rearwardly and compress the spring 33, which in turn will progressively increase the friction of the secondary surfaces and thereby progressively increase the torque and speed of the transmission or propeller shaft. If the overload at the moment is not great, the load will be picked up and the transmission shaft 6—7 will acquire the same speed as the motor driven member 1 before the spring 33 is completely compressed, and before the transmission member has reached the limit of its movement. If, however, the overload is great, the transmission member will travel to the limit of its movement and the transmission shaft 6—7 will then be positively rotated by the clutch member 8. After the desired speed of the transmission shaft 6—7 is reached, necessity for the degree of power required to reach this speed ceases and the supply of gas may then be throttled slightly to cause the motor to develop only the power necessary to maintain the desired speed of the transmission shaft 6—7. This controlling action results in momentarily slowing the motor driven member 1, while the acquired momentum of the load or moving car momentarily maintains the acquired speed of the transmission shaft 6—7. This produces a reverse action of the sleeve 13 and the worm 30, and this reverse action returns the worm to its normal position at the forward end of the sleeve; that is, the position shown in Fig. 1. The power of the throttled motor being sufficient to keep the car in motion at normal speed, or what is herein termed "under normal load", and the pressure device being adapted to prevent slipping of the secondary surfaces under normal load, the car will go on with the parts in position as shown in Fig. 1. If at any time thereafter it is desired to increase the speed of the car, the throttle is opened and this results in the introduction of more gas into the cylinders of the motor and consequently an increase in the force of the explosions. This results in increased stresses, suddenly applied. Under these conditions, the present device permits the motor to make several revolutions at a speed higher than the speed of the transmission shaft 6—7, while it is increasing its own power and while it is progressively increasing the speed of the transmission shaft and car. The device acts automatically in this case as well as when the car is started, and the worm is returned to its normal position when the increased speed desired is reached in precisely the same manner as before.

A screw plug 37 is threaded in the sleeve 13 and has for its object the closure of an opening in the wall of the sleeve, through which oil or other lubricant may be introduced into the interior of the sleeve or drained therefrom. A small quantity of lubricant within the sleeve 13 will be carried to all the wearing surfaces within the sleeve by the rotation of the same, and since it cannot escape from the sleeve, the necessity for frequent lubrication is eliminated.

Means are provided for producing a bodily movement of the clutch member 8 toward and away from the primary frictional driving surface 2, in order to throw the clutch member in and out of engagement with the motor driven member. This means includes a spring 34 interposed between the hub of the motor driven member 1 and a plate 35, which plate forms a part of a thrust bearing surrounding the reduced end of the tail shaft 5 and bearing against the plate 21. Interposed between the plate 35 and the plate 21 is an annular ring 36 of leather or other suitable material which will retain a lubricant in and around this thrust bearing. The spring 34 normally operates to move the clutch member bodily rearward, and to hold the primary frictional driving surfaces 2 and 9 in driving contact.

Manually operated means are provided for throwing the primary frictional driving surfaces out of engagement. This means consists of a forked lever 38, which straddles the transmission or propeller shaft 6—7 at the rear of the sleeve 13 and bears against a thrust bearing 39, which in turn bears against the gland 28 before referred to. By an inspection of Fig. 1, it will be seen that the fork of the lever 38 is long enough to permit a limited angular variation of the position of the transmission or propeller shaft 6—7. It will be further seen that the forward side of this lever is curved in an arc which has its center at the center of oscillation of the articulation of the clutch members 12 and 13, so that variation in the position of shaft 6—7 will not alter the position of the lever 38. This lever is supported by a fulcrum 40, which may be a bar extending across the chassis, or which may be of any other form or otherwise mounted if desired. The lever is operated by means of a connecting rod consisting of two sections 41 and 42, which sections are united by means of an adjusting turnbuckle 43, the section 42 being pivoted at 44 to the upper end of the lever 38. The upper part of the lever carries a pad 45 which is securely fastened thereto and which is constructed of leather or other suitable material. This pad is adapted to come in contact with a flange 46 formed on the extreme rear end of the sleeve 13 when the lever is operated to throw the clutch out of engagement. By an inspection of Fig. 1, it will be seen that this pad 45 is normally out of contact with the flange 46; when the lever is operated, however, the pad moves through a longer arc than that part of the lever engaging the thrust bearing 39 and consequently overtakes the flange 46 and acts as a brake thereon after the surfaces 2 and 9 are thrown out of contact. This braking action is desirable for the reason that whenever it is desired to change gears, the disengaged clutch member should be slowed down before the gears are thrown into engagement.

In view of the foregoing, a detailed description of the operation of the device is deemed unnecessary and is therefore omitted in the interest of brevity.

What is claimed is:

1. The combination with a motor driven member having a frictional driving surface, of a transmission shaft, a two-part articulated clutch member interposed between said motor driven member and said shaft, one of the parts of said clutch member having a primary frictional driving surface coöperating with the frictional driving surface of the motor driven member when fully engaged therewith to cause the clutch member to be rotated without slip under any load, the other part of said clutch member having a secondary frictional surface, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of said clutch member toward and away from the motor driven member.

2. The combination with a motor driven member having a frictional driving surface, of a transmission shaft, a two-part articulated clutch member including a universal joint and an oil-tight case therefor interposed between said motor driven member and said shaft, one of the parts of said clutch member having a primary frictional driving surface coöperating with the frictional driving surface of the motor driven member when fully engaged therewith to cause the clutch member to be rotated without slip under any load, the other part of said clutch member having a secondary frictional surface, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of said clutch member toward and away from the motor driven member.

3. The combination with a motor driven member having a frictional driving surface, of a transmission shaft, a two-part articulated clutch member interposed between said motor driven member and said shaft, one of the parts of said clutch member having a primary frictional driving surface coöperating with the frictional driving surface of the motor driven member when fully engaged therewith to cause the clutch member to be rotated without slip under any load, the other part of said clutch member having a secondary frictional surface, a common support for the motor driven member and one part of the articulated clutch member, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of said clutch member toward and away from the motor driven member.

4. The combination with a motor driven member having a frictional driving surface, of a driving shaft supporting, driving and projecting beyond the motor driven member, a transmission shaft, a two-part articulated clutch member interposed between said motor driven member and said shaft, one of the parts of said clutch member having a primary frictional driving surface coöperating with the frictional driving surface of the motor driven member when fully engaged therewith to cause the clutch member to be rotated without slip under any load and being supported on the projecting end of the driving shaft, the other part of said clutch member having a secondary frictional surface, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of said clutch member toward and away from the motor driven member.

5. The combination with a motor driven member having a frictional driving surface, of a transmission shaft, a two-part articulated clutch member interposed between said motor driven member and said shaft, one of the parts of said clutch member having a primary frictional driving surface coöperating with the frictional driving surface of the motor driven member when fully engaged therewith to cause the clutch member to be rotated without slip under any load and being rotatable in the same plane as the motor driven member, the other part of said clutch member having a secondary frictional surface and being free to rotate on a swinging axis, a transmission member rotatable with the transmission shaft and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of said clutch member toward and away from the motor driven member.

6. The combination with a motor driven member having a frictional driving surface, of a transmission shaft, a two-part articulated clutch member interposed between said motor driven member and said shaft, one of the parts of said clutch member having a primary frictional driving surface coöperating with the frictional driving surface of the motor driven member when fully engaged therewith to cause the clutch member to be rotated without slip under any load and being rotatable in the same plane as the motor driven member, the other part of said clutch member having an internal secondary frictional surface and being free to rotate on a swinging axis, a transmission member rotatable with the transmission shaft within the swinging part of said clutch member and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, and means for producing a bodily movement of said clutch member toward and away from the motor driven member.

7. The combination with a motor driven member having a frictional driving surface, of a transmission shaft, a two-part articulated clutch member interposed between said motor driven member and said shaft, one of the parts of said clutch member having a primary frictional driving surface coöperating with the frictional driving surface of the motor driven member when fully engaged therewith to cause the clutch member to be rotated without slip under any load and being rotatable in the same plane as the motor driven member, the other part of said clutch member having an internal secondary frictional surface and being free to rotate on a swinging axis, a transmission member rotatable with the transmission shaft within the swinging part of said clutch member and having a coöperating secondary frictional surface, a pressure device engaging said clutch member and said transmission member and adapted to hold the secondary surfaces in contact under sufficient pressure to prevent slipping of said surfaces under normal load and adapted to permit a relative slip of said surfaces for a plurality of turns under a load above normal, said transmission shaft and said transmission member being relatively longitudinally movable irrespective of rotation and angularity, and means for producing a bodily movement of said clutch member toward and away from the motor driven member.

In testimony whereof, I have signed my name to this specification in the presence of two subscribing witnesses.

SYDNEY I. PRESCOTT.

Witnesses:
 FRANK H. VICK, Jr.,
 ELIZABETH L. RUSSELL.